No. 893,996. PATENTED JULY 21, 1908.
E. J. GÜNTHER.
TOOL HOLDER FOR LATHES, PLANING MACHINES, AND OTHER ANALOGOUS MACHINE TOOLS.
APPLICATION FILED JAN. 22, 1907.
2 SHEETS—SHEET 1.
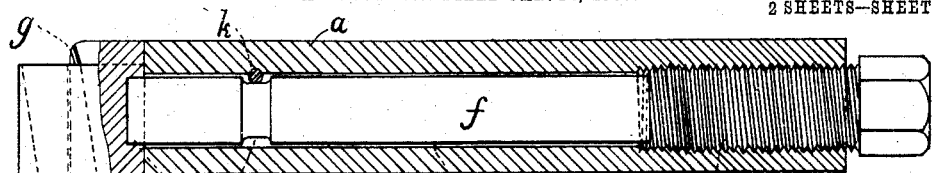
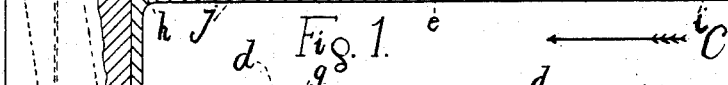
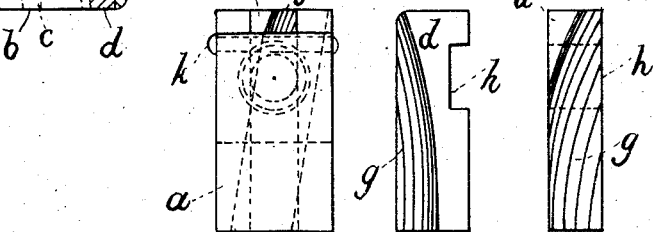
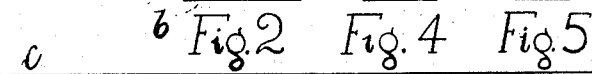
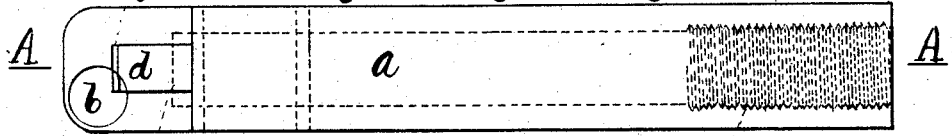
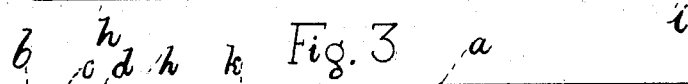
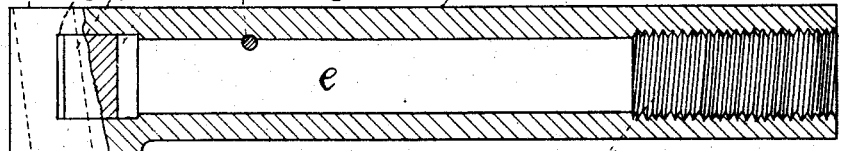
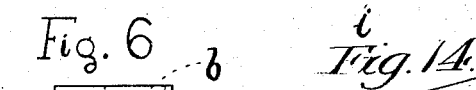
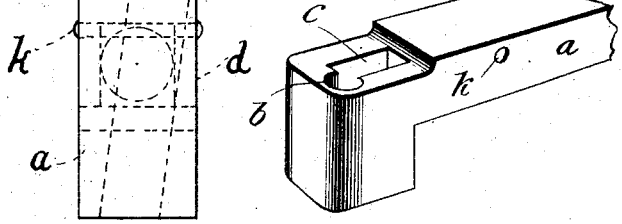
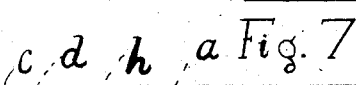
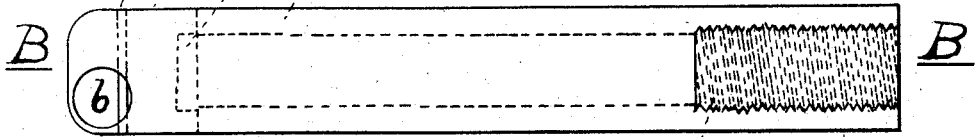
Witnesses:
Gustave Browne.
Henry Thieme.
Inventor
Emilius John Günther
by attorneys No. 893,996. PATENTED JULY 21, 1908.
E. J. GÜNTHER.
TOOL HOLDER FOR LATHES, PLANING MACHINES, AND OTHER ANALOGOUS MACHINE TOOLS.
APPLICATION FILED JAN. 22, 1907.

2 SHEETS—SHEET 2.

Witnesses:
Gustave Browne
Henry Thieme

Inventor
Emiliue John Günther
by attorneys

UNITED STATES PATENT OFFICE.

EMILIUS JOHN GÜNTHER, OF DIDSBURY, ENGLAND.

TOOL-HOLDER FOR LATHES, PLANING-MACHINES, AND OTHER ANALOGOUS MACHINE-TOOLS.

No. 893,996.  Specification of Letters Patent.  Patented July 21, 1908.

Application filed January 22, 1907. Serial No. 353,427.

*To all whom it may concern:*

Be it known that I, EMILIUS JOHN GÜNTHER, engineer, a subject of the King of the United Kingdom of Great Britain and Ireland, and resident of Garswood, Parkfield Road, Didsbury, in the county of Lancaster, England, have invented new and useful Improvements in Tool-Holders for Lathes, Planing-Machines, and other Analogous Machine-Tools, of which the following is a specification.

The object of this invention of improvements in tool-holders for lathes, planing machines and other analogous machine-tools is to provide holders for cutting parts of steel, of round, square or other section which shall afford the advantages that the cutting parts may be securely held in the holders and be prevented from rocking or moving therein and that there are no set-screws or other loose pieces liable to be lost when the cutting parts are released.

According to this invention the body of a tool-holder to receive a piece of steel of round, square or other section to form a cutting part is provided with a hole of suitable shape in a suitable position and at a suitable inclination to the length of the tool-holder to receive the said piece of steel and with a clamping block or clamping blocks mounted in a slot or slots in the body of the said tool-holder and shaped or made capable of being moved in the manner necessary to bear upon the said piece of steel and adapted to be pressed upon and to be held secure against escape from the said slot or slots by means of a set-screw or set-screws extending lengthwise of the said body and made to screw therein and to project into the said block or blocks and the set-screw or set-screws is or are secured against accidental withdrawal from the body of the tool-holder and against accidental release of the said clamping block or blocks by means of a pin or key or pins or keys secured in the body of the tool-holder and made to lie in a recess or recesses or groove or grooves or behind a collar or collars formed around the said set-screw or set-screws.

Figure 9:
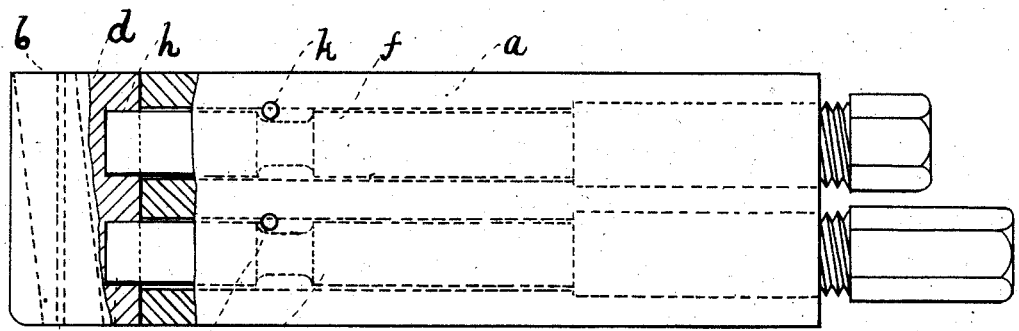
Figure 10:
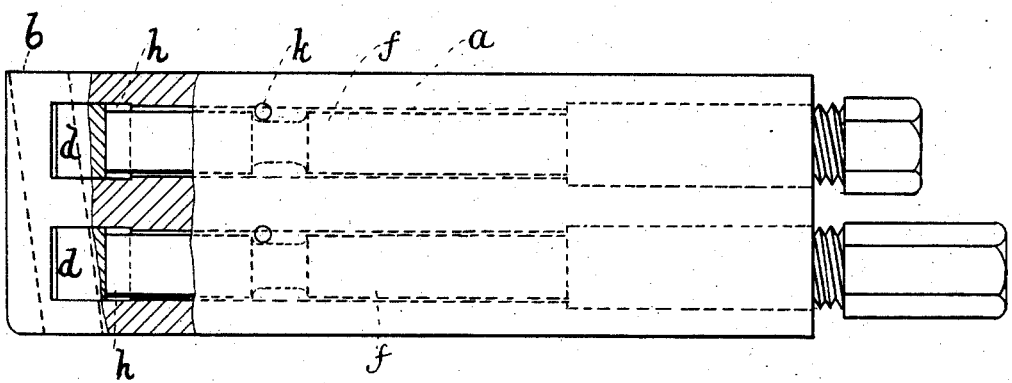
Figures 11, 12, 13:
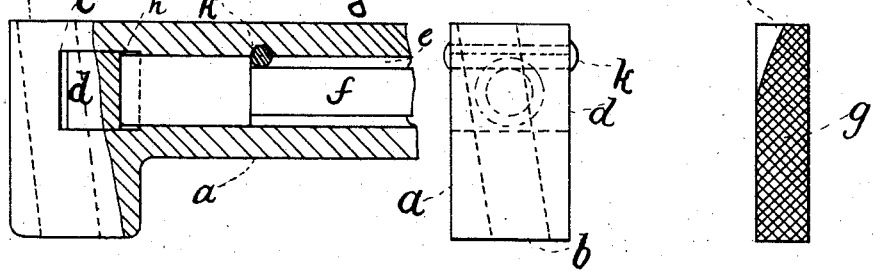

In the accompanying drawings in all the figures of which the same letters of reference are employed to indicate corresponding parts, Figure 1 is a longitudinal section in part a side view of one form of tool-holder constructed according to this invention and Fig. 2 is an end elevation thereof, Fig. 3 is a plan of the said tool-holder but without the set-screw employed therein, the line A A of Fig. 3 indicating the plane upon which the vertical section in Fig. 1 is taken. Fig. 4 is a side elevation and Fig. 5 a front elevation of a clamping block employed in the tool-holder illustrated in Figs. 1 and 2. Fig. 6 is a side elevation in part a vertical section of a second form of tool-holder constructed according to this invention and Figs. 7 and 8 are respectively a front elevation and a plan thereof, the line B B of Fig. 8 indicating the plane on which the section shown in Fig. 6 is taken. Fig. 9 is a side elevation in part a vertical section of a third form of tool-holder constructed according to this invention. Fig. 10 is a side elevation in part a vertical section of a fourth form of tool-holder constructed according to this invention. Fig. 11 is a partial longitudinal section in part a side elevation and Fig. 12 is a front elevation of a fifth form of tool-holder constructed according to this invention. Fig. 13 is a front elevation of a clamping block similar to that shown in Figs. 4 and 5 but with a roughened surface, to bear on the tools to be secured in a tool-holder by means of it. Fig. 14 is a detail view in perspective showing the head and shank as illustrated in Figs. 1, 2 and 3.

In the tool-holder illustrated by Figs. 1 and 2, $a$ is the body which is formed in part as a shank to be inserted in the slide-rest or other corresponding part by which the tool-holder is to be secured in the machine-tool in which it is to be employed. In the body $a$ an oblique hole $b$ of any suitable shape according to the section of steel intended to be used for tools is formed to receive a piece of steel to form the cutting part to be mounted in the tool-holder. In the case illustrated the hole $b$ is made circular. The body $a$ is also formed with a slot $c$ communicating with the oblique hole $b$ to receive a clamping-block $d$ to be pressed against the said piece of steel and also with a hole $e$ formed in part with a screw-thread $i$ to receive a set-screw $f$ extending from the rear of the tool-holder $a$ into the slot $c$.

The part of the body $a$ in which the oblique hole $b$ and slot $c$ are formed may be made of any size relatively to the size of the shank which may be convenient. The clamping-block $d$ which is made to fit and to be capable of being slid backwards and forwards for a little distance in the body $a$ is formed with a hollow bearing surface $g$ of a form adapted to bear in the manner requisite upon the piece of steel to be inserted in the hole $b$ and is provided at the rear with a recess $h$ into which the one end of the set-screw $f$ is made to enter in order that it may be used to secure the clamping-block $d$ against accidental escape from the body of the tool-holder $a$ as well as by being made to bear upon the clamping-block $d$ and to press it in the direction indicated by the arrow C to press it upon the piece of steel to be held in the tool-holder $a$. The set-screw $f$ which is formed with a head and near the head with a screw-thread $i$ to engage with that formed in the body $a$ and made to project at its other end into the recess $h$ of the block $d$ is formed in the case illustrated with a groove $j$ extending around it and a pin $k$ driven into the body $a$ so as to be sufficiently firmly fixed therein is made to enter the said groove $j$ so as to prevent the set-screw $f$ from being moved more than a certain distance lengthwise in the body $a$. The width of the groove $j$ relatively to the diameter of the pin $k$ is made such that while the set-screw $f$ may be moved in the direction indicated by the arrow C far enough to enable a piece of steel to be securely held in the tool-holder by the clamping-block $d$ despite any wear which may take place in the clamping-block $d$ or in the end of the set-screw $f$ made to bear thereon, the set-screw $f$ shall be prevented from being moved in the direction opposite to that indicated by the arrow C so far as to be withdrawn from the recess $h$ of the clamping block $d$.

It is obvious that the head of the set-screw $f$ is very easily accessible so that a piece of steel may be secured in and released from the tool-holder $a$ very readily and without any key needing to be inserted between the slide-rest or other part holding the tool-holder $a$ and the object being operated upon and thus it is very convenient to employ an ordinary screw-key.

The clamping-block $d$ of the tool-holder $a$ shown in Figs. 1 and 2 is mounted in a vertical position therein but obviously clamping-blocks mounted in other positions may be used and Figs. 6, 7 and 8 illustrate the body $a$ and clamping-block $d$ of a tool-holder in which the clamping block $d$ is mounted horizontally and transversely in the body $a$.

In any case in which it may be desirable the clamping block may be serrated or roughened on the surface $g$ intended to bear against the piece of steel to be held in the tool-holder as is illustrated in Fig. 13 and in any case in which it may be desirable the screw may be made to fit closely in the interior of the tool-holder for any desirable portion or portions of its length so as to be secured against vibration therein, as for example at the part nearest the clamping block as is illustrated in Fig. 11 and in any case in which it may be desirable more than one screw may be provided either for use with one clamping block as is illustrated in Fig. 9 which shows two screws $f$ used with one clamping block $d$ or for use with more than one clamping-block as is illustrated in Fig. 10 which shows two screws $f$ used with two clamping blocks $d$ $d$, each screw being engaged with the clamping block with which it is used like the screw $f$ shown in Figs. 1, 2 and 3. Tool-holders may be constructed according to this invention to hold tools in any convenient positions as may be desirable for different purposes, thus for example, Figs. 1, 2, 3, 6, 7, 8, 9 and 10 show tool-holders adapted to hold tools at the left hand side and Figs. 11 and 12 show a tool-holder adapted to hold a tool at the right hand side, Fig. 11 also showing the pin $k$ inserted into the body $a$ of the tool-holder as placed behind a collar on the screw $f$.

In a tool-holder constructed according to this invention the clamping-block or clamping-blocks affords or afford a secure bearing for the piece of steel forming the cutting part so as to prevent it from rocking in the tool-holder and there is no liability for the clamping block itself or the clamping blocks themselves to rock in the tool-holder. The clamping-block or clamping-blocks cannot fall out of the tool-holder when the screw or screws is or are withdrawn to release the piece of steel forming the cutting part and the screw or screws and clamping block or blocks can only be removed when the pin or key or pins or keys used to limit the movement of the screw or screws is or are withdrawn intentionally. The screw or screws may be made of any diameter desirable and may conveniently be made of a diameter larger in proportion to the pieces of steel to be held than the screws which can be employed in tool-holders of the kinds hitherto provided and may be provided with a head or heads of any convenient size capable of being used with an ordinary screw-key or wrench so that any force requisite may be easily applied to it or them and so that the use of any special key is unnecessary. Furthermore, a tool-holder constructed according to this invention may be mounted in a lathe, planing machine or other machine-tool so as to be held close to the part in which the piece of steel forming the cutting part is mounted and the piece of steel to be used to form the cutting part can be supported throughout a great part of its length and very close to the part by which it is made to act upon the objects operated upon and so can be made of slighter section than would otherwise be necessary and may be kept in use until much shorter than the pieces of tool-steel which can be used in tool-holders of the kinds hitherto provided thus enabling economy in tool-steel to be attained.

What I do claim and desire to secure by Letters Patent is:—

1. In a tool-holder to hold a cutting-tool in a machine-tool the combination of a body provided with a hole to receive a piece of steel to form a cutting tool with a second hole screw-threaded to receive a set-screw and with a slot to receive a clamping block opening into and extending beyond the first hole and formed transversely to the second hole, a clamping block mounted in the said slot and guided by the walls thereof to slide in the said body both in the direction of and transversely to the screw-threaded hole and also obliquely relatively to the hole provided to receive a piece of steel and furnished with a bearing face to be forced into contact with a piece of steel in the said hole and also furnished with a recess to receive the one end of a set screw, a set-screw mounted in the screw-threaded second hole in the body and entering the recess in the said clamping block and furnished with means to be engaged by a key and a key inserted in the said body to engage with the said set-screw and thus to limit its longitudinal movement whereby the said set-screw serves to press the bearing surface of the clamping block obliquely against a piece of steel in the first hole and to prevent the clamping block being released accidentally from the said body, substantially as hereinbefore described.

2. In a tool-holder to hold a cutting tool in a machine tool the combination of a body provided with a hole to receive a piece of steel to form a cutting tool with holes screw-threaded to receive set screws and with a slot to receive a clamping block opening into and extending beyond the first hole and formed transversely to the screw-threaded holes, a clamping block mounted in the said slot and guided by the walls thereof to slide in the said body both in the direction of and transversely to the screw-threaded holes and also obliquely relatively to the hole provided to receive a piece of steel and furnished with a bearing face to be forced into contact with a piece of steel in the said hole and also furnished with recesses to receive corresponding ends of set-screws, set-screws mounted in the screw-threaded holes and entering the recesses in the said clamping block and furnished with means to be engaged by retaining means inserted in the said body, retaining means inserted in the said body to engage with the said set-screws and thus to limit their longitudinal movement, whereby the said set-screws serve to press the bearing surface of the clamping block obliquely against a piece of steel in the first hole and to prevent the clamping block from being released accidentally from the said body, substantially as hereinbefore described.

In testimony, that I claim the foregoing as my invention, I have signed my name in presence of two witnesses, this eleventh day of January 1907.

EMILIUS JOHN GÜNTHER.

Witnesses:
   HOWARD CHEETHAM,
   RUTH M. WILSON.